(12) United States Patent
Ghosh et al.

(10) Patent No.: US 10,860,471 B2
(45) Date of Patent: Dec. 8, 2020

(54) REAL-TIME CHANNEL OPTIMIZER

(71) Applicant: Dell Products L.P., Round Rock, TX (US)

(72) Inventors: Mahuya Ghosh, Hyderabad (IN); Mohammed O. Rahman, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 16/239,873

(22) Filed: Jan. 4, 2019

(65) Prior Publication Data
US 2020/0218643 A1 Jul. 9, 2020

(51) Int. Cl.
G06F 12/02 (2006.01)
H04L 12/24 (2006.01)
G06F 13/16 (2006.01)
G06F 13/12 (2006.01)

(52) U.S. Cl.
CPC .............. *G06F 12/02* (2013.01); *G06F 13/12* (2013.01); *G06F 13/1694* (2013.01); *H04L 41/046* (2013.01); *H04L 41/06* (2013.01)

(58) Field of Classification Search
CPC ...... G06F 12/02; G06F 13/12; G06F 13/1694; H04L 41/046; H04L 41/06; H04M 3/5183; H04M 3/5233; G06Q 30/016
See application file for complete search history.

(56) References Cited

U.S. PATENT DOCUMENTS

| | | | |
|---|---|---|---|
| 8,103,531 B2* | 1/2012 | Wollan | G06Q 10/063 705/7.11 |
| 8,565,411 B2* | 10/2013 | Kannan | H04L 12/1827 379/265.13 |
| 2013/0211880 A1* | 8/2013 | Kannan | G06Q 30/0203 705/7.32 |
| 2016/0212265 A1* | 7/2016 | Philonenko | H04M 3/5183 |
| 2016/0371703 A1* | 12/2016 | Monegan | H04L 67/148 |
| 2019/0021093 A1* | 1/2019 | Anderson | H04W 72/085 |
| 2020/0045175 A1* | 2/2020 | Deole | H04M 3/5238 |
| 2020/0090087 A1* | 3/2020 | Singh | G06Q 10/063114 |

* cited by examiner

*Primary Examiner* — Todd L Barker
(74) *Attorney, Agent, or Firm* — Terrile, Cannatti & Chambers; Stephen A. Terrile

(57) ABSTRACT

A system, method, and computer-readable medium for performing a customer service channel selection operation. The customer service channel selection operation includes identifying a plurality of customer service channels associated with an organization; collecting channel data associated with each of the plurality of customer service channels; processing the channel data associated with each of the plurality of customer service channels to generate channel metrics associated with each of the plurality of customer service channels; and, generating channel insights and predictions based upon the channel data associated with each of the plurality of customer services channels.

11 Claims, 5 Drawing Sheets

| Customer Service Channel 206 | Channel Session Volume 514 | X = Channel Session Volume Score 516 | Average Service Issue Resolution Time 518 | Y = Average Service Issue Resolution Time Score 520 | Z = Customer Sentiment Analysis Score 522 | $t_n$ = Channel Score = Average Of (X, Y, Z) 524 | $m_n$ = Channel Utilization Parameter 526 | Optimum Customer Service Channel 528 IF $t_n = m_n$ = TRUE, Then No Suggestion  IF $t_n > m_n$ = FALSE, Then Suggest Channel $t_{n-1} > m_n$ = TRUE With Highest Channel Score |
|---|---|---|---|---|---|---|---|---|
| User Forum 226 | 58 | 2 | 3 Minutes | 2 | 3 | 2.3 = 46% | 90% | 46% > 90% = FALSE |
| Social Media 228 | 56 | 3 | 15 Minutes | 1 | 3 | 2.3 = 46% | 70% | 46% > 70% = FALSE |
| Web Chat 230 | 24 | 5 | 10 Seconds | 5 | 3 | 4.3 = 86% | 80% | 86% > 80% = TRUE |
| Email 232 | 38 | 4 | 2 Minutes | 3 | 3 | 3.3 = 66% | 75% | 66% > 75% = FALSE |
| Telephone 236 | 60 | 1 | 20 Seconds | 4 | 3 | 2.7 = 54% | 65% | 54% > 65% = FALSE |

Figure 5

REAL-TIME CHANNEL OPTIMIZER

BACKGROUND OF THE INVENTION

Field of the Invention

The present invention relates to information handling systems. More specifically, embodiments of the invention relate to automating the selection of an optimum customer service channel.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for performing a customer service channel selection operation.

More specifically, in one embodiment the invention relates to a method for performing a customer service channel selection operation, comprising: identifying a plurality of customer service channels associated with an organization; collecting channel data associated with each of the plurality of customer service channels; processing the channel data associated with each of the plurality of customer service channels to generate channel metrics associated with each of the plurality of customer service channels; and, generating channel insights and predictions based upon the channel data associated with each of the plurality of customer services channels.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of customer service channels associated with an organization; collecting channel data associated with each of the plurality of customer service channels; processing the channel data associated with each of the plurality of customer service channels to generate channel metrics associated with each of the plurality of customer service channels; and, generating channel insights and predictions based upon the channel data associated with each of the plurality of customer services channels.

In another embodiment the invention relates to a computer-readable storage medium embodying computer program code, the computer program code comprising computer executable instructions configured for: identifying a plurality of customer service channels associated with an organization; collecting channel data associated with each of the plurality of customer service channels; processing the channel data associated with each of the plurality of customer service channels to generate channel metrics associated with each of the plurality of customer service channels; and, generating channel insights and predictions based upon the channel data associated with each of the plurality of customer services channels.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows a table containing customer service channel data that can be used to automatically select an optimum customer service channel.

DETAILED DESCRIPTION

A system, method, and computer-readable medium are disclosed for automating the selection of an optimum customer service channel. Certain aspects of the invention include an appreciation that organizations may use a variety of communication channels when providing customer support. As an example, a customer may have the option of receiving support via user forum postings, social media exchanges, web chat sessions, email interactions, and telephone conversations. Certain aspects of the invention likewise include an appreciation that each of these communication channels may have certain advantages and limitations.

Accordingly, selecting the optimum channel of communication for resolving a customer support issue may prove challenging. For example, a telephone conversation with a customer support representative (CSR) may provide the best approach to resolving a complex support issue, especially if its resolution requires iterative questions from the CSR and associated responses from the customer. However, wait times may be long. Likewise, a web chat session may have a shorter wait time, but describing a support issue by text can be tedious and responses may not be as detailed as desired.

Certain aspects of the invention likewise reflect an appreciation that approaches are known for estimating the shortest wait times for various customer support channels. However, such approaches fail to provide an estimation of which customer support channel will successfully resolve a customer support issue in the shortest amount of time. Consequently, a user with a customer support issue may inadvertently select a customer support channel with a short wait time, but ultimately spend more time than necessary before their issue is resolved.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
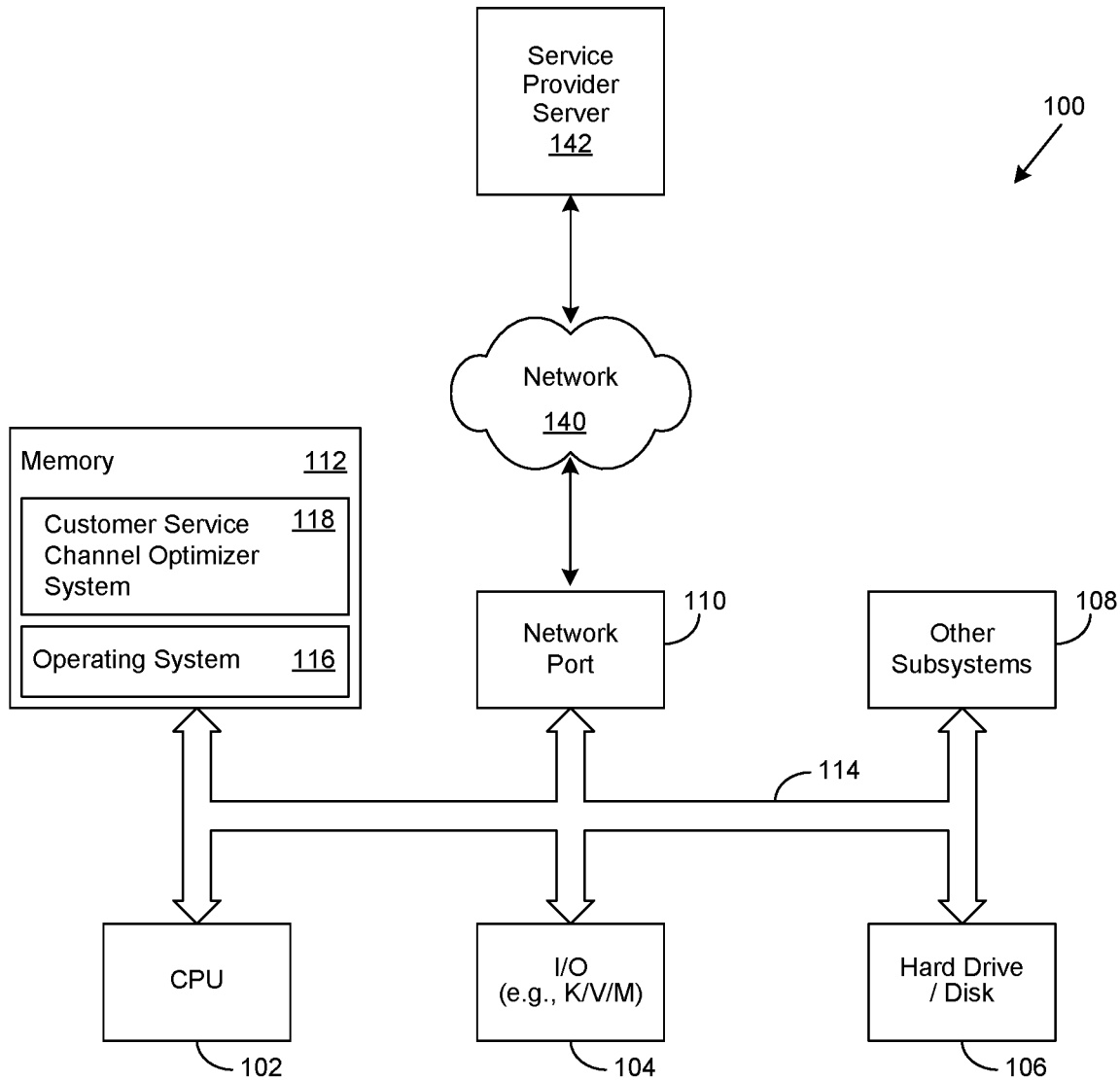
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a customer service channel optimizer system 118. In one embodiment, the information handling system 100 is able to download the customer service channel optimizer system 118 from the service provider server 142. In another embodiment, the customer service channel optimizer system 118 is provided as a service from the service provider server 142.

The customer service channel optimizer system 118 performs an optimum customer service channel selection 118 operation. The optimum customer service channel selection operation improves processor efficiency, and thus the efficiency of the information handling system 100, facilitating the selection of an optimum customer service channel. In certain embodiments, the optimum customer service channel selection operation can be performed in near real-time during operation of an information handling system 100. As will be appreciated, once the information handling system 100 is configured to perform the optimum customer service channel selection operation, the information handling system 100 becomes a specialized computing device specifically configured to perform the selection of an optimum customer service channel and is not a general purpose computing device. Moreover, the implementation of the customer service channel optimizer system 118 on the information handling system 100 improves the functionality of the information handling system 100 and provides a useful and concrete result of automating the selection of an optimum customer service channel. In certain embodiments, the automated selection of an optimum customer service channel results in the realization of improved customer satisfaction.

Figure 2:
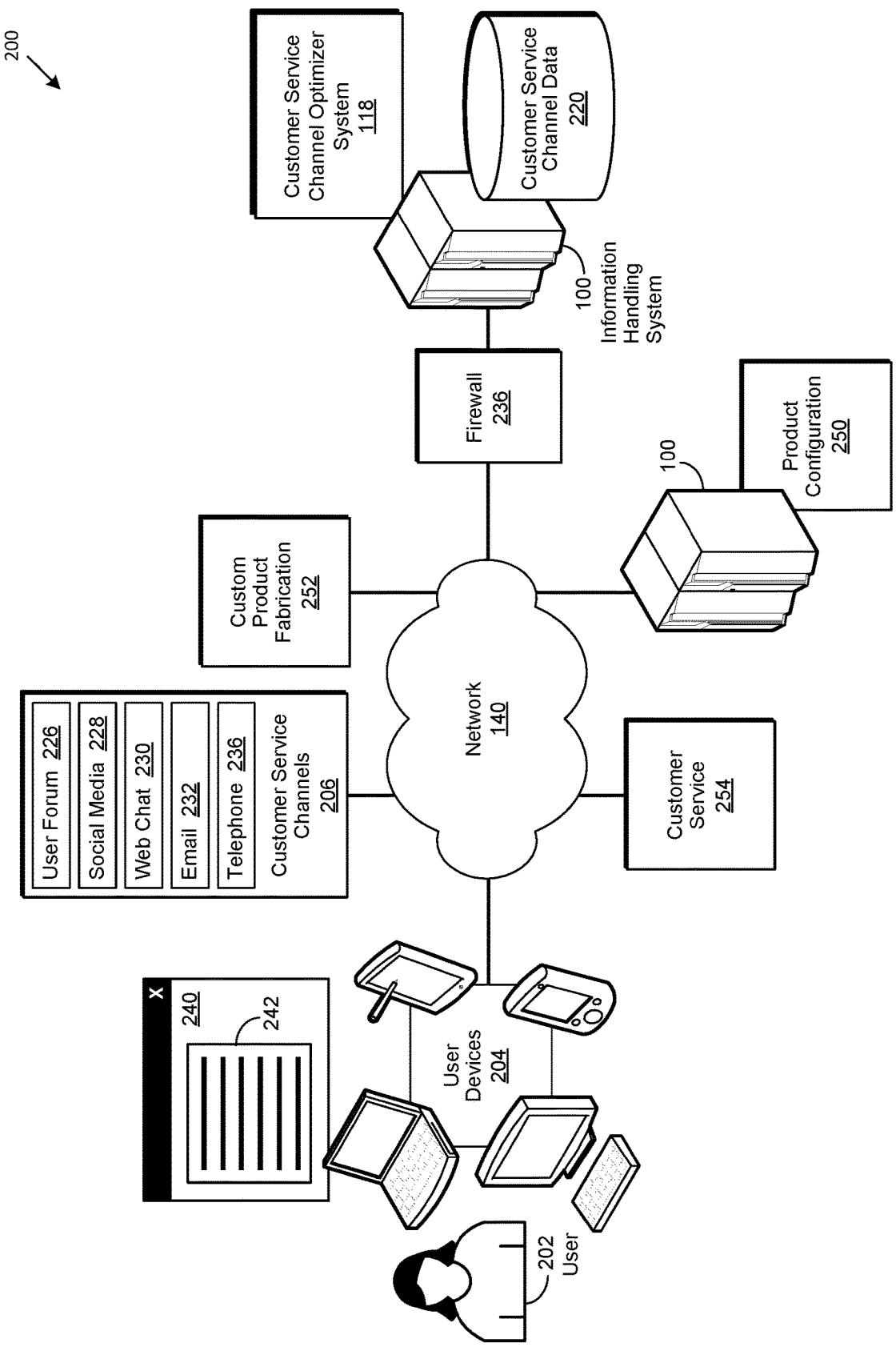
FIG. 2 shows a block diagram of a customer service environment.

FIG. 2 shows a block diagram of a customer service environment 200 implemented in accordance with an embodiment of the invention. In certain embodiments, the customer service environment 200 may include a customer service channel optimizer system 118. In certain embodiments, the customer service environment 200 may include a repository of customer service data 220. In certain embodiments, the repository of customer service data 220 may be local to the system executing the customer service channel optimizer system 118 or may be executed remotely.

In certain embodiments, the customer service channel optimizer system 118 may be implemented to automatically select an optimum customer service channel 206 in near real-time. As used herein, a customer service channel 206 broadly refers to a channel of communication used by an organization to provide customer service to a user 202. Examples of such customer service channels 206 include user forum 226 postings, social media 228 exchanges, web chat 230 sessions, email 232 interactions, and telephone 236 conversations.

As likewise used herein, an optimum customer service channel 206 broadly refers to a customer service channel 206 that can be used to resolve a particular customer service issue in the shortest amount of time with the highest level of customer satisfaction relative to other customer service channels. As an example, a user 202 may have a customer support issue that is relatively simple and can be resolved equally well via any of the afore-mentioned customer service channels 206. However, analysis of session volumes, and their corresponding support issue resolution times, by the customer service channel optimizer system 118 may indicate that a web chat 230 session may be the optimum customer service channel 206 at that particular point in time.

Likewise, as used herein, near real-time broadly refers to the time delay introduced by the transmission of certain information via a network 140, automated processing of such information, or a combination thereof, between the occurrence of an event and a corresponding response. In certain embodiments, the event may include a user 202 submitting a customer service request through a first customer service channel 206 to a customer service system 254. In certain embodiments, the response may include the customer service channel optimizer system 118 automatically selecting a second customer service channel 206 that is the most optimum, followed by providing a recommendation to that effect to the user 202. In various embodiments, the selection of the second customer service channel 206 may be based upon certain parameters, as described in greater detail herein, to determine which customer service channel 206 is most optimum.

In certain embodiments, a user 202 may use a user device 204 to interact with the customer service channel optimizer system 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a customer service channel optimizer system user interface (UI) 240. In certain embodiments, the customer service channel optimizer system UI 240 may be implemented to present a graphical representation 242 of customer service channel information, which is automatically generated in response to interaction with the customer service channel optimizer system 118.

In certain embodiments, the user device 204 is used to exchange information between the user 202 and the customer service channel optimizer system 118, a product configuration system 250, a custom product fabrication system 252, a customer service system 254, or a combination thereof, through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention. In certain embodiments, a firewall 236 familiar to those of skill in the art may be located between the customer service channel optimizer system 118 and the network 140. It will be appreciated that other firewalls may be present between the network and one or more of the customer service channel 206, the product configuration system 250, the custom product fabrication system 252, and the customer service system 254.

In various embodiments, the customer service channel optimizer system UI 240 may be presented via a website. In certain embodiments, the website may be provided by one or more of the customer service channel optimizer system 118 and the product configuration system 250. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the customer service channel optimizer system 118 may be implemented to interact with the product configuration system 250, which in turn may be executing on a separate information handling system 100. In various embodiments, the product configuration system 250 interacts with a custom product fabrication system 252. In various embodiments, the custom product fabrication system 252 fabricates products, which in turn may be associated with the custom product fabrication system 252 and the products it may fabricate. In certain embodiments, the customer service channel optimizer system 118 may be implemented to automatically select an optimum customer service channel selection 206, as described in greater detail herein.

Figure 3:
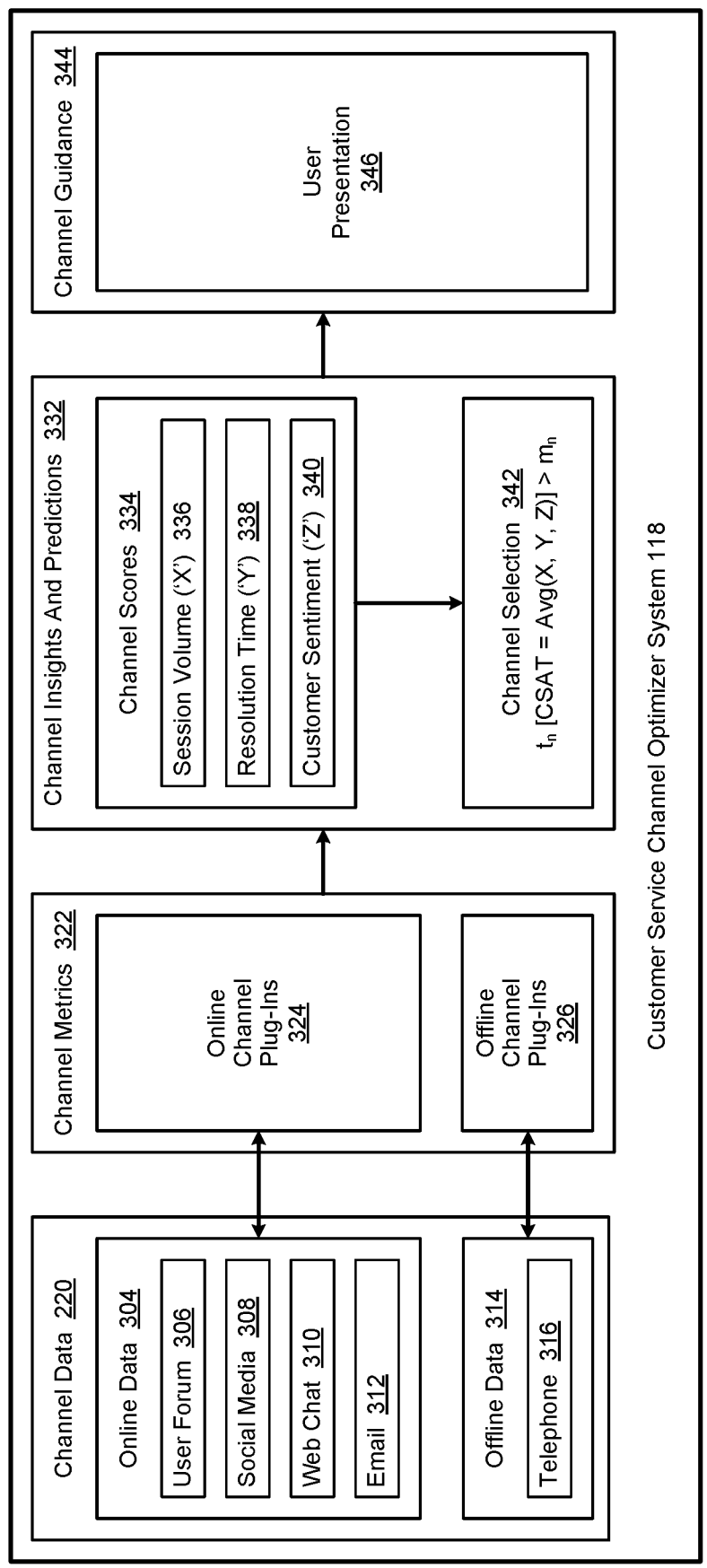
FIG. 3 shows a functional block diagram of a customer service channel optimizer system.

FIG. 3 shows a functional block diagram of a customer service channel optimizer system implemented in accordance with an embodiment of the invention. In certain embodiments, channel data 220 associated with various customer service channels may be collected and then processed to generate corresponding channel metrics 322. In certain embodiments, the resulting channel metrics 322 may in turn be processed to generate channel insights and predictions 332, which may then used to provide channel guidance 344 related to the selection of an optimum customer service channel. In certain embodiments, the channel data 220 may include online 304 data, offline 314 data, or a combination thereof. In certain embodiments, the online 304 data may include data associated with email 306, user forum 308, social media 310, and web chat 312 customer service channels. In certain embodiments, the offline 314 data may include data associated with telephone 318 customer service channels.

In certain embodiments, various online 324 and offline 326 channel plug-ins familiar to those of skill in the art may be used to respectively collect the online 304 data and offline 314 data used to generate channel metrics 322. In various embodiments, the channel metrics 322 may be used to perform certain data analytics operations to generate a set of customer service channel scores 334. In certain embodiments, the customer service channel scores 334 may include a session volume score ('X') 336, an average customer service issue resolution time score ('Y'), and a customer sentiment analysis ('Z') score for each customer service channel at a particular point in time.

As used herein sentiment analysis broadly refers to the use of natural language processing (NLP), text analysis, and computational linguistics to systematically identify, extract, quantify, and study affective states and subjective information. In general, known sentiment analysis approaches are often useful in determining the attitude, contextual polarity, or emotional reaction of individual, or a group of, users to a document, event, or interaction. In particular, as it relates to the invention, sentiment analysis may be performed in certain embodiments to customer service reviews, survey responses, and social media interactions to ascertain customer attitudes to various aspects of a customer service experience.

In certain embodiments, the resulting set of customer service channel scores 334 may be used by the customer service channel optimizer system 118 to perform various customer service channel insights and predictions 332 operations. In certain embodiments, the customer service insights and predictions 332 operations may include a customer service channel selection 342 operation. In certain embodiments, the customer service channel selection 342 operation may be implemented to use the customer service channel scores 334 as follows to automatically select an optimum customer service channel:

$$t_n[\text{CSAT}=\text{Avg}(X,Y,Z)]>m_n$$

where:
- $t_n$ is a customer service channel score for a particular customer service channel,
- CSAT is a value corresponding to a measure of customer satisfaction with a particular customer service channel, and
- $m_n$ is a target customer service channel threshold utilization metric for a particular customer service channel.

In these embodiments, the selection of a target customer service channel threshold utilization metric $m_n$ for a particular customer service channel, and the method by which it is selected, is a matter of design choice. As an example, the threshold utilization metric $m_n$ for various customer service channels may be selected as follows:
- user forum $m_1$=90%
- social media $m_2$=70%
- web chat $m_3$=80%
- email $m_4$=75%
- telephone $m_5$=65%

In certain embodiments, the results of the customer service channel selection 342 operation may be used to provide customer service channel guidance 344 to a user. In certain embodiments, the customer service channel guidance 344 may be provided in the form of a user presentation 346 to the user. In certain embodiments, the user presentation 346 may be provided within a user interface (UI) of a user device, described in greater detail herein.

Figure 4:
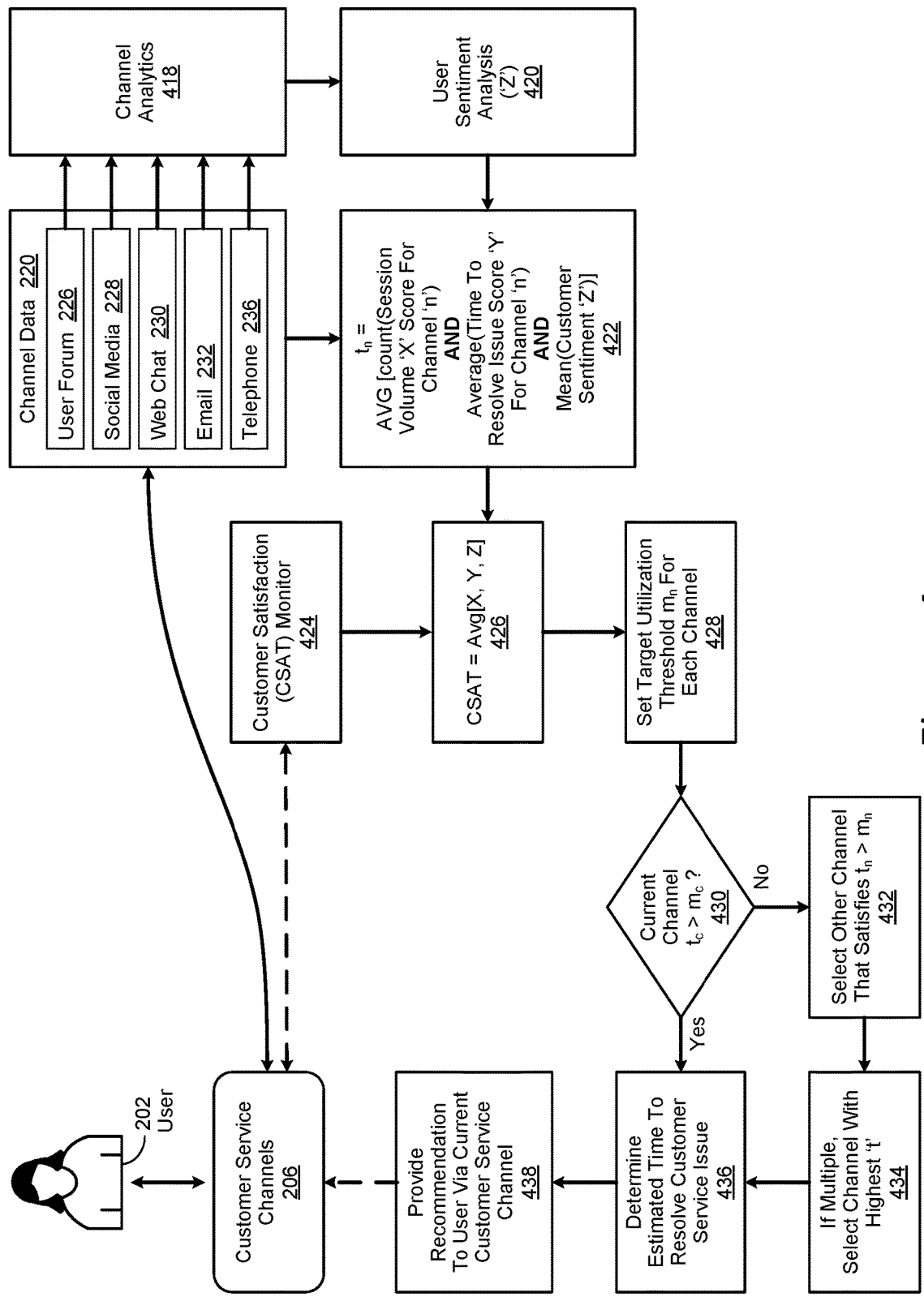
FIG. 4 shows a process flow of operations for automating the selection of an optimum customer service channel.

FIG. 4 shows a process flow of operations implemented in accordance with an embodiment of the invention for automating the selection of an optimum customer service channel. In this embodiment, a user 202 may select a particular customer service channel 206 to request resolution of a customer service issue. In certain embodiments, the customer service channels 206 may include user forum 226 postings, social media 228 exchanges, web chat 230 sessions, email 232 interactions, and telephone 236 conversations. In various embodiments, certain customer service channel data 220 corresponding to each customer service channel 206 may be analyzed, as described in greater detail herein, to generate associated customer service channel analytics 418.

In certain embodiments, the resulting customer service analytics may in turn be used to perform various user sentiment analysis operations 420 to determine a customer sentiment analysis score 'Z'. In certain embodiments, the mean of the customer sentiment analysis score 'Z' is used along with the channel session volume score 'X' and the average service issue resolution time score for each customer service channel 206 to determine a corresponding customer service channel score $t_n$ 422 as follows:

$$t_n = \text{Avg}[X, Y, \text{Mean}(Z)]$$

In certain embodiments, a customer satisfaction (CSAT) monitor 424 may be implemented to monitor CSAT associated with each customer service channel 206. In certain embodiments, a CSAT metric may be determined in step 426 as follows:

$$\text{CSAT} = \text{Avg}(X, Y, Z)$$

Once a CSAT metric 424 has been determined for each customer service channel 206, a corresponding customer service channel threshold utilization parameter $m_n$ is set in step 428.

Thereafter, a determination is made in step 430 whether the customer service channel score $t_c$ corresponding to the customer service channel 206 currently being used by the user 202 is greater than its associated customer service channel threshold utilization parameter $m_c$. If not, then another customer service channel 206 is selected in step 432 whose customer service channel score $t_n$ is greater than its associated customer service channel threshold utilization parameter $m_n$. If there are multiple customer service channels whose customer service channel score $t_n$ are greater than their associated customer service channel threshold utilization parameter $m_n$, then the customer service channel with the highest customer service channel score $t_n$ is selected in step 434.

Thereafter, or if it was determined in step 430 that the value of $t_c$ corresponding to the customer service channel 206 currently being used by the user 202 is greater than its associated $m_c$ parameter, then the estimated time to resolve the customer service issue with the optimum customer service channel 206 is determined in step 436. Thereafter, the optimum customer service channel 206 is recommended to the user 202 via the customer service channel 206 they are currently using in step 438. In certain embodiments, the recommendation may include the estimated time it will take each customer service channel 206 to resolve the customer service issue submitted by the user.

In certain embodiments, the user may be offered the option of switching from the customer service channel 206 they are currently using to the recommended optimum customer service channel 206. In these embodiments, the method by which the user 202 is provided the recommendation, and the method by which they switch from one customer service channel 206 to another, or a combination thereof, is a matter of design choice. Skilled practitioners of the art will recognize that many such embodiments are possible. Accordingly, the foregoing is not intended to limit the spirit, scope or intent of the invention.

FIG. 5 shows a table containing exemplary customer service channel data implemented in accordance with an embodiment of the invention to automatically select an optimum customer service channel. This example shows how a best channel for a customer is selected when performing the optimum customer service channel selection operation. In this example, customer service channels 206 may include user forum 226 postings, social media 228 exchanges, web chat 230 sessions, email 232 interactions, and telephone 236 conversations. To continue the example, each customer service channel 206 has a channel session volume 514 for a particular period of time and a corresponding channel session volume score 'X' 516. In certain embodiments, the channel session volume score 'X' 516 may be implemented to rank various customer service channels 206 according to their respective channel session volume 514.

Likewise, each customer service channel 206 has an average service issue resolution time 518 for a particular period of time and a corresponding average service issue resolution time score 'Y' 520. In certain embodiments, the service issue resolution time score 'Y' 520 may be implemented to rank various customer service channels 206 according to their respective average service issue resolution time 514. Likewise, as shown in FIG. 5, each customer service channel 206 has a corresponding customer sentiment analysis score 'Z' 522, a customer service channel score $t_n$ 524 and a customer service channel utilization parameter $m_n$ 526. In certain embodiments, a particular customer service channel score $t_n$ 524 may be determined by calculating the average of its corresponding channel session volume score 'X' 516, average service issue resolution time score 'Y' 520, and customer sentiment analysis score 'Z' 522.

In certain embodiments, the selection of an optimum customer service channel 528 to suggest to a user may be determined as follows:
 IF $t_n = m_n$ = TRUE, then no suggestion
 IF $t_n > m_n$ = FALSE, then suggest customer support channel
  where:
  $t_{n-1} > m_n$ = TRUE with highest customer service channel
   score $t_n$ 524

In continuance of this example, the web chat 310 customer service channel 206 has a customer service channel score $t_n$ 524 of 86% and a customer service channel utilization parameter $m_n$ 526 of 80%. Accordingly, its customer service channel score $t_n$ 524 of 86% is greater than its corresponding customer service channel utilization parameter $m_n$ 526 of 80%, which indicates that web chat 310 is the optimum customer service channel 206 to suggest to a user.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a customer service channel selection operation, comprising:
   identifying a plurality of customer service channels associated with an organization;
   collecting channel data associated with each of the plurality of customer service channels;
   processing the channel data associated with each of the plurality of customer service channels to generate channel metrics associated with each of the plurality of customer service channels;
   generating channel insights and predictions based upon the channel data associated with each of the plurality of customer services channels;
   generating the channel insights and predictions comprises performing a data analytics operation to generate a customer service channel score associated with each of the plurality of customer service channels; and,
   using the channel insights and predictions to automatically select a particular service channel from the plurality of customer service channels as an optimum customer service channel; and wherein
   a target customer service channel threshold utilization metric is used to select the particular service channel, the target customer service channel threshold utilization metric being calculated so that:

$$t_n[\text{CSAT}=\text{Avg}(X,Y,Z)]>m_n$$

where:
   X is a channel session volume score,
   Y is an average service issue resolution time score,
   Z is a customer sentiment analysis score,
   Avg is an average of the channel session volume score, the average service issue revolution score and the customer sentiment score,
   CSAT is a value corresponding to a measure of customer satisfaction with a particular customer service channel, the value corresponding to the measure of customer satisfaction being equal to the average of the channel session volume score, the average service issue revolution score and the customer sentiment score,
   $t_n$ is a customer service channel score for a particular customer service channel,
   $m_n$ is a target customer service channel threshold utilization metric for a particular customer service channel, and the particular service channel is selected when the customer service channel score for the particular customer service channel is greater than the target customer service channel threshold utilization metric for the particular customer service channel.

2. The method of claim 1, further comprising:
using a channel plug-in to collect the channel data associated with each of the plurality of customer service channels.

3. The method of claim 1, wherein:
the customer service channel score associated with each of the plurality of customer service channels comprises at least one of a session volume score, an average customer service issue resolution time score and a customer sentiment analysis score.

4. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying a plurality of customer service channels associated with an organization;
collecting channel data associated with each of the plurality of customer service channels;
processing the channel data associated with each of the plurality of customer service channels to generate channel metrics associated with each of the plurality of customer service channels;
generating channel insights and predictions based upon the channel data associated with each of the plurality of customer services channels
generating the channel insights and predictions comprises performing a data analytics operation to generate a customer service channel score associated with each of the plurality of customer service channels; and,
using the channel insights and predictions to automatically select a particular service channel from the plurality of customer service channels as an optimum customer service channel; and wherein
a target customer service channel threshold utilization metric is used to select the particular service channel, the target customer service channel threshold utilization metric being calculated so that:

$$t_n[\text{CSAT}=\text{Avg}(X,Y,Z)]>m_n$$

where:
X is a channel session volume score,
Y is an average service issue resolution time score,
Z is a customer sentiment analysis score,
Avg is an average of the channel session volume score, the average service issue revolution score and the customer sentiment score,
CSAT is a value corresponding to a measure of customer satisfaction with a particular customer service channel, the value corresponding to the measure of customer satisfaction being equal to the average of the channel session volume score, the average service issue revolution score and the customer sentiment score,
$t_n$ is a customer service channel score for a particular customer service channel,
$m_n$ is a target customer service channel threshold utilization metric for a particular customer service channel, and
the particular service channel is selected when the customer service channel score for the particular customer service channel is greater than the target customer service channel threshold utilization metric for the particular customer service channel.

5. The system of claim 4, wherein the instructions executable by the processor are further configured for:
using a channel plug-in to collect the channel data associated with each of the plurality of customer service channels.

6. The system of claim 4, wherein:
the customer service channel score associated with each of the plurality of customer service channels comprises at least one of a session volume score, an average customer service issue resolution time score and a customer sentiment analysis score.

7. A non-transitory, computer-readable storage medium embodying computer program code, the computer program code comprising computer executable instructions configured for:
identifying a plurality of customer service channels associated with an organization;
collecting channel data associated with each of the plurality of customer service channels;
processing the channel data associated with each of the plurality of customer service channels to generate channel metrics associated with each of the plurality of customer service channels;
generating channel insights and predictions based upon the channel data associated with each of the plurality of customer services channels
generating the channel insights and predictions comprises performing a data analytics operation to generate a customer service channel score associated with each of the plurality of customer service channels; and,
using the channel insights and predictions to automatically select a particular service channel from the plurality of customer service channels as an optimum customer service channel; and wherein
a target customer service channel threshold utilization metric is used to select the particular service channel, the target customer service channel threshold utilization metric being calculated so that:

$$t_n[\text{CSAT}=\text{Avg}(X,Y,Z)]>m_n$$

where:
X is a channel session volume score,
Y is an average service issue resolution time score,
Z is a customer sentiment analysis score,
Avg is an average of the channel session volume score, the average service issue revolution score and the customer sentiment score,
CSAT is a value corresponding to a measure of customer satisfaction with a particular customer service channel, the value corresponding to the measure of customer satisfaction being equal to the average of the channel session volume score, the average service issue revolution score and the customer sentiment score,
$t_n$ is a customer service channel score for a particular customer service channel,
$m_n$ is a target customer service channel threshold utilization metric for a particular customer service channel, and the particular service channel is selected when the customer service channel score for the particular customer service channel is greater than the target customer service channel threshold utilization metric for the particular customer service channel.

8. The non-transitory, computer-readable storage medium of claim 7, wherein the computer executable instructions are further configured for:

using a channel plug-in to collect the channel data associated with each of the plurality of customer service channels.

9. The non-transitory, computer-readable storage medium of claim 7, wherein:

the customer service channel score associated with each of the plurality of customer service channels comprises at least one of a session volume score, an average customer service issue resolution time score and a customer sentiment analysis score.

10. The non-transitory, computer-readable storage medium of claim 7, wherein:

the computer executable instructions are deployable to a client system from a server system at a remote location.

11. The non-transitory, computer-readable storage medium of claim 7, wherein:

the computer executable instructions are provided by a service provider to a user on an on-demand basis.

* * * * *